Dec. 18, 1928.

F. B. KAUFMAN 1,695,335

COMBINATION CABINET

Filed Dec. 30, 1925

Inventor—
Frederick B. Kaufman.
by his Attorneys
Howson & Howson

Dec. 18, 1928.

F. B. KAUFMAN 1,695,335

COMBINATION CABINET

Filed Dec. 30, 1925

Inventor:—
Frederick B. Kaufman
by his Attorneys—
Howson & Howson

Dec. 18, 1928.

F. B. KAUFMAN 1,695,335

COMBINATION CABINET

Filed Dec. 30, 1925

Inventor.—
Frederick B. Kaufman.
by his Attorneys.—
Howson & Howson

Dec. 18, 1928.  1,695,335
F. B. KAUFMAN
COMBINATION CABINET
Filed Dec. 30, 1925   6 Sheets-Sheet 4
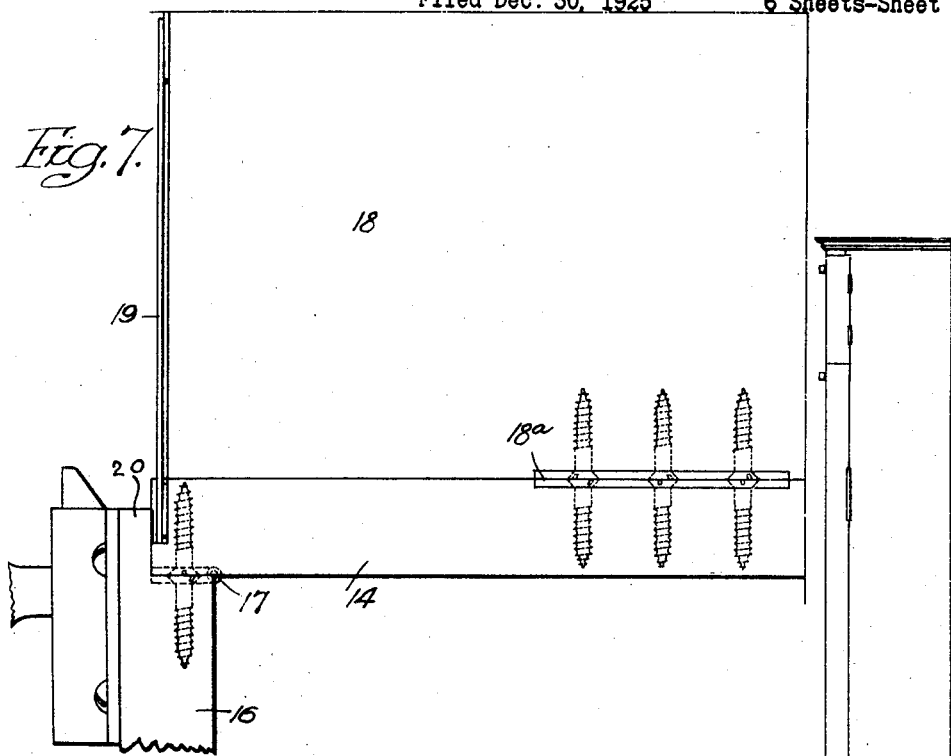
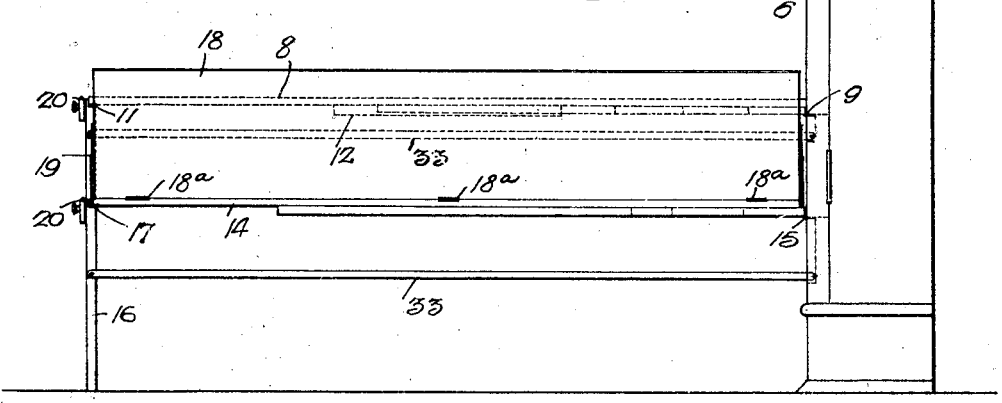
Inventor—
Frederick B. Kaufman
by his Attorneys
Howson & Howson Dec. 18, 1928.

F. B. KAUFMAN 1,695,335

COMBINATION CABINET

Filed Dec. 30, 1925

Inventor-
Frederick B. Kaufman
by his Attorneys-
Howson & Howson

Dec. 18, 1928.  
F. B. KAUFMAN  
COMBINATION CABINET  
Filed Dec. 30, 1925  
1,695,335  
6 Sheets-Sheet 6
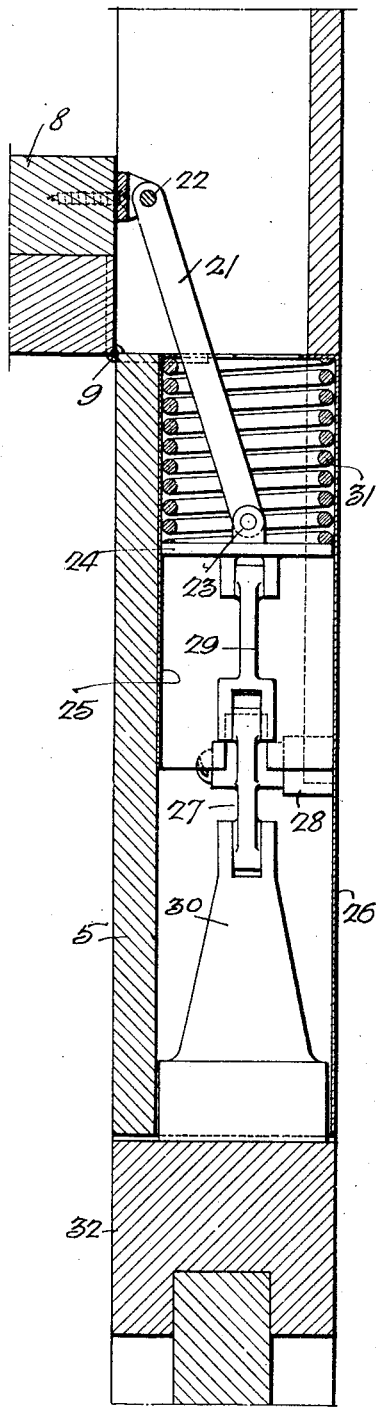
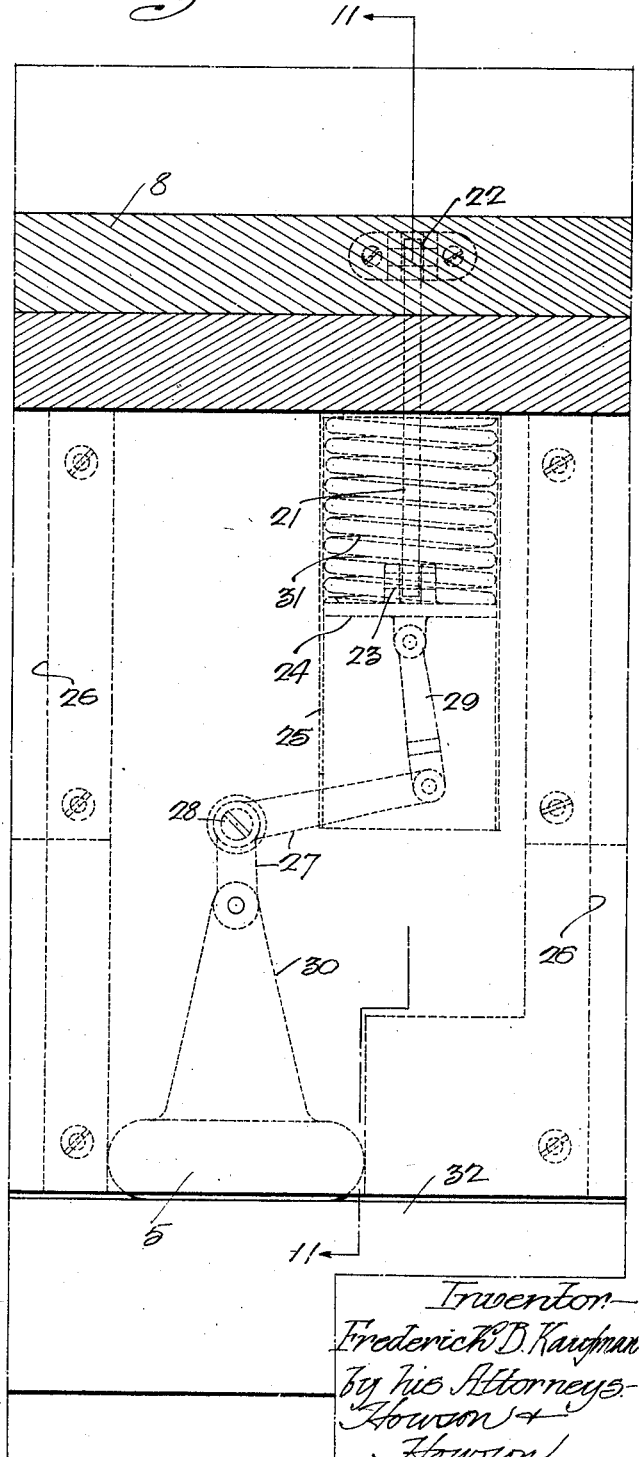
Inventor—
Frederick B. Kaufman
by his Attorneys
Howson &
Howson Patented Dec. 18, 1928.

1,695,335

UNITED STATES PATENT OFFICE.

FREDERICK B. KAUFMAN, OF PHILADELPHIA, PENNSYLVANIA.

COMBINATION CABINET.

Application filed December 30, 1925. Serial No. 78,451.

The invention relates to cabinets of the type in which a table or bench is provided which, when not in use, can be folded back against the cabinet to leave the floor in front of the cabinet clear of obstructions.

The object of the invention is to provide means for taking the weight of a table, bench, or like structure, off of the supporting mechanism when turned in a substantially horizontal position.

The invention also relates to certain details of construction described hereinafter.

Fig. 6 is a side elevation of the cabinet as shown in Fig. 5 with the benches and table lowered into the operative position;

Fig. 7 is a fragmentary enlargement of an outer portion of the bench where the leg joins the seat and illustrates a detail of the construction;

Fig. 10 is a view similar to that of Fig. 8 but illustrating the device when the parts are in the lowered or operative position; and Fig. 11 is a section on the line 11—11, Fig. 10.

Figure 1:
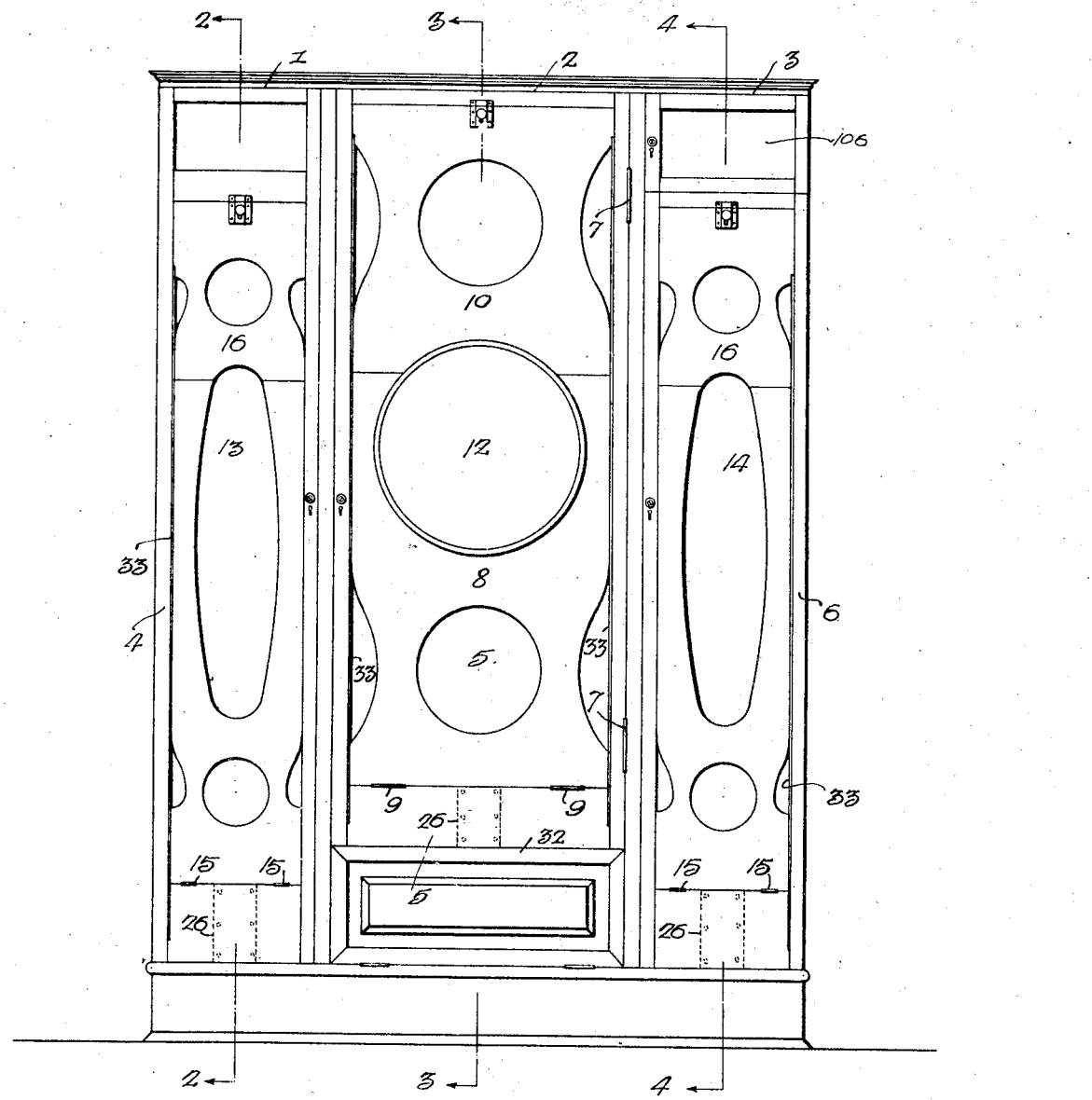
Figure 1 is a front elevation of the cabinet with all the associated elements enclosed.
Figure 2:
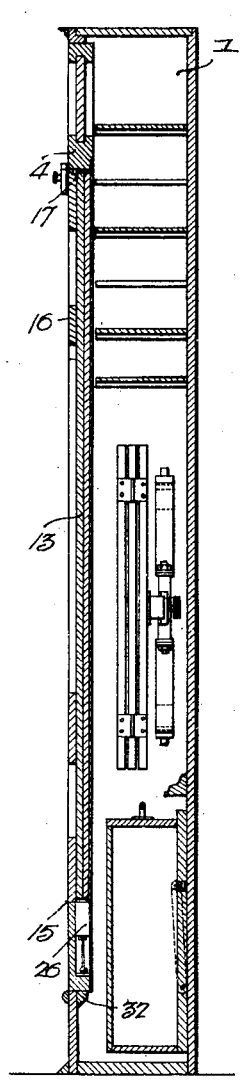
Fig. 2 is a section on the line 2—2, Fig. 1.
Figure 3:
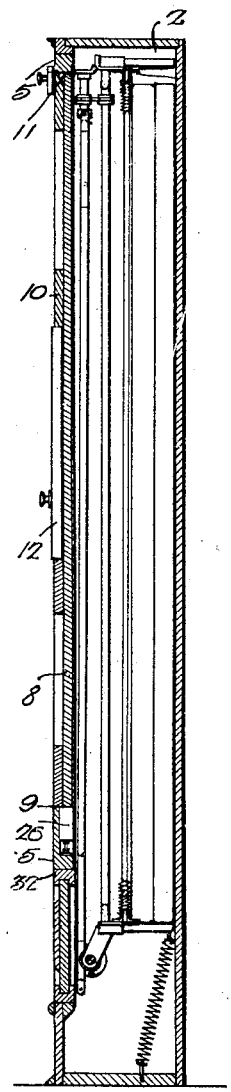
Fig. 3 is a section on the line 3—3, Fig. 1.
Figure 4:
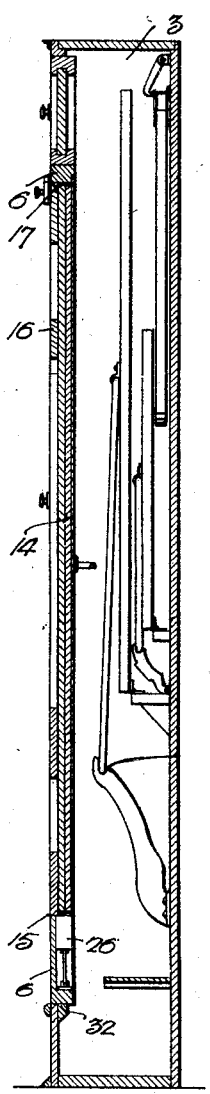
Fig. 4 is a section on the line 4—4, Fig. 1.
Figure 5:
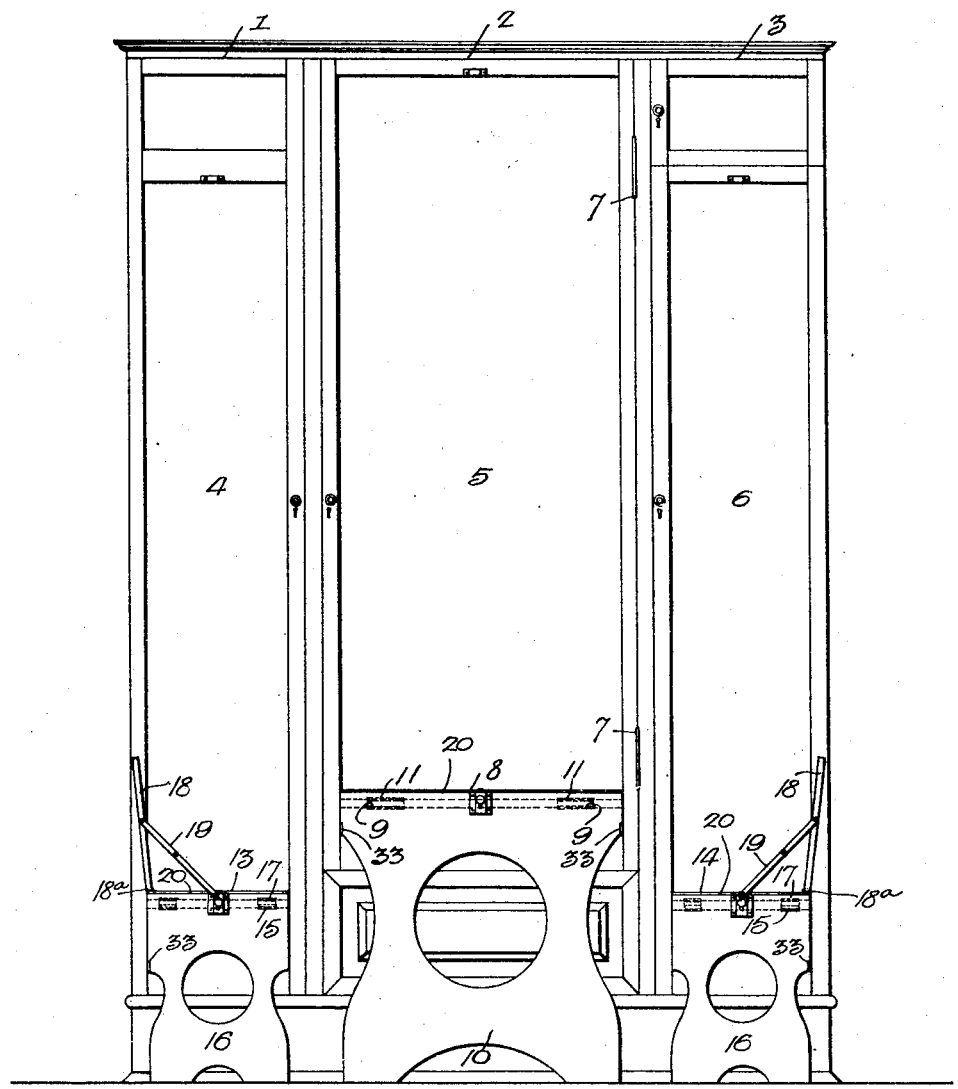
Fig. 5 is a front view of the cabinet showing the table and bench on each side thereof swung downwardly upon the horizontal hinges upon which they are normally supported in a vertical position against the front panels of the doors of the cabinet, as shown in Fig. 1.

Referring to the drawings, the cabinet in the form illustrated comprises three vertical compartments 1, 2 and 3, (see Figures 2, 3 and 4). Each of these compartments is normally closed by a door, 4, 5 and 6, respectively, the doors 4 and 6 of the two outer compartments being hinged at their outer vertical edges so as to swing outwardly and away from the central portion of the cabinet, and the door 5 being hinged on the right vertical edge, (see Fig. 1), the hinges for the latter door being designated by the reference numeral 7. On the outer face of the door 5 is mounted a table 8, this table being secured to the door at its lower edge by hinges 9, as well illustrated in Fig. 1. The hinges 9 provide the support for the inner end of the table when the latter is in the lowered or operative position, as shown in Fig. 5, and at the outer edge the table is supported in this operative position by a leg 10 which as shown in Fig. 7 is connected by means of hinges 11 to the outer or—in the elevated position—upper edge of the table. The under side of the table which is exposed when in the elevated or inoperative position is so recessed in the upper portion that this leg element 10 or the exposed face thereof lies flush with the under surface of the table, and as shown in Fig. 1, the exposed portions of the table in the elevated position may be ornamented by means of panels so as to present a uniform appearance tending to obscure the real nature of the exposed parts. In the present instance, I have illustrated a circular mirror 12 set in the under side of the table.

Seats 13 and 14 respectively are mounted in similar manner on the doors 4 and 6 of the side compartments, being supported at the inner edge on hinges 15 and having at the upper or outer edges a leg 16 secured to the table by hinges 17, (see Fig. 7). In this instance also the under surfaces of the benches are recessed for reception of the leg 16 when the tables are in the elevated or inoperative position, and the under sides are recessed and paneled in such manner as to provide a uniform and ornamental appearance, as illustrated in Fig. 1. Each of the panels includes a back-rest 18 hinged at the lower edge to the rear or outer edges of the panels, as indicated at 18ª, and collapsible struts 19 are provided to support the backs against the strains placed upon them. These backs, as will be apparent, are adapted to fold down flat upon the tops of the benches when the latter are to be elevated to the inoperative position. In order to give a more finished appearance by hiding the hinges 11 and 17 when the table and benches are in the elevated position, the leg 10 and the leg 16 are recessed at the top, as illustrated in Fig. 7, which shows in side elevation the upper portion of one of the legs 16, (the upper edge of the leg 10 being similarly formed). It will be apparent that when the parts are in the elevated or inoperative position, the elevated flange 20 will overlie and hide the hinge 15 or 11, as the case may be.

In order to provide for the automatic movement of the legs of the table and benches to the normal operative position, as shown in Figs. 6 and 7, each of the legs has attached thereto a rod 33, there being one of these rods pivotally secured to each side of the table leg. The other or inner end of each of the rods is secured to the framework of the cabinet at a point below the lower edge of the table or bench, as the case may be, a distance equal to the space between the outer end of the rod 33 and the hinge of the leg to which the rod is attached. Recesses are provided at the outer edges of the table and along the outer edge of each of the benches, as shown in Fig. 1, into which the rods 33 fit when the table and benches are in the elevated position. When these parts are lowered, however, the rods function to force the legs outwardly away from the under sides of the table and benches and eventually into the normal position as shown in Fig. 6. These rods function also as struts preventing accidental displacement of the legs inwardly when the parts are in use.

Figure 9:
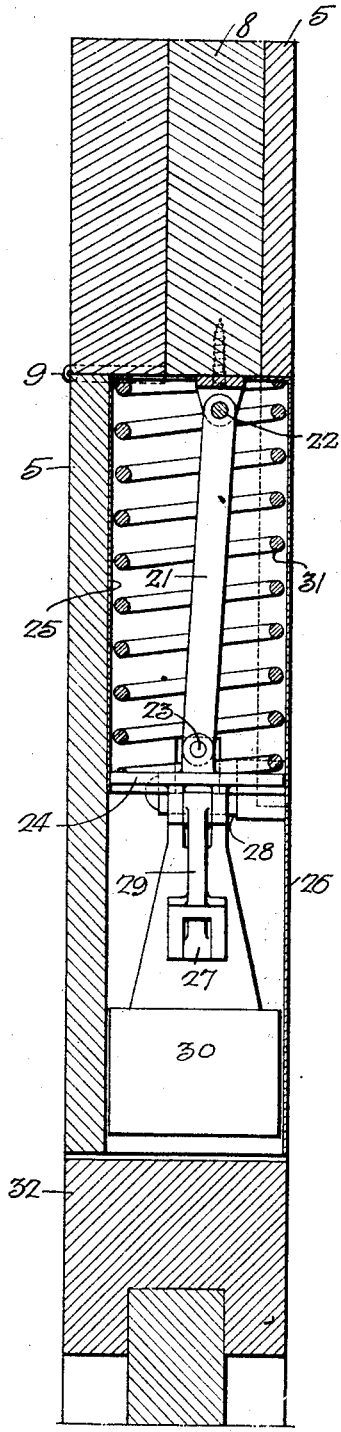
Fig. 9 is a section on the line 9—9, Fig. 8.
Figure 8:
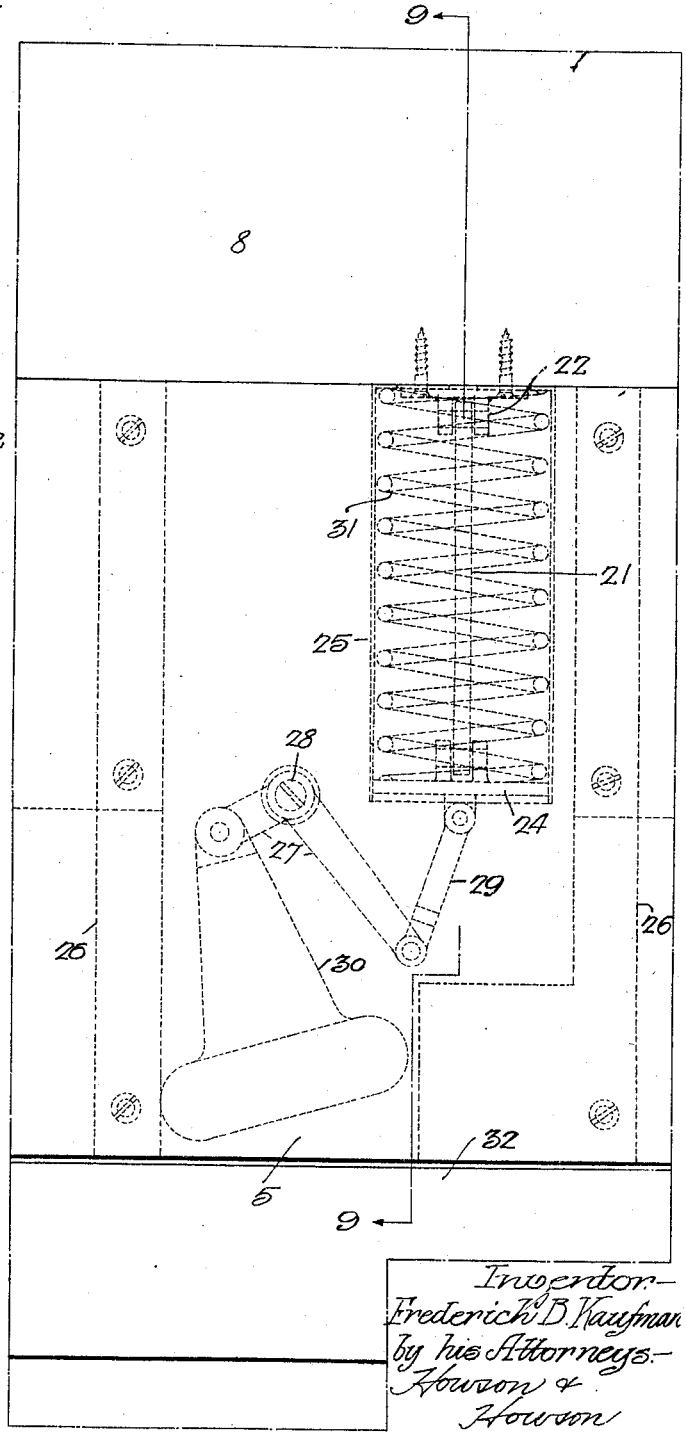
Fig. 8 is a fragmentary elevational view illustrating the device for relieving the cabinet doors of the strain due to the weight of the various elements where they are pivotally secured in the cabinet.

It will be noted that by reason of the fact that the table and chairs when in the operative position are supported at their inner ends by the doors to which they are attached, there is placed upon the respective doors and their vertical hinges a torsional strain which ordinarily would require extremely strong and large hinges. In order to obviate the use of such hinges, I provide a device for relieving the doors of this strain when the parts are in the operative position by transferring the weight of the inner ends of the table and benches to the fixed frame of the cabinet. The devices by which I accomplish this end are illustrated in detail in Figs. 8 to 11, inclusive. The device consists of an arm 21 whose upper end is pivotally secured at 22 to the inner edge of the table or bench, as the case may be, and whose lower end is pivotally secured at 23 to a plunger or follower 24 vertically movable within a cylinder 25, the latter being secured in the door immediately below the inner edges of the table and benches when the latter are in the elevated position and centrally arranged with respect thereto. It will be understood that the table and each of the benches is equipped with one of these strain-relieving devices, and their positions will be more readily understood by reference to Fig. 1, in which the devices are indicated in broken lines and designated by the reference numeral 26. The device further comprises a bell crank lever 27 pivotally secured to the door adjacent the lower end of the cylinder 25, as indicated by the reference numeral 28, one end of this bell crank lever being connected by means of a link 29 to the under side of the follower 24, and the other arm of the bell crank lever being connected pivotally to a shoe 30 which, when the parts are elevated and inoperative, assumes a position as shown in Figs. 8 and 9, this position of the shoe being assumed by reason of a spring 31 within the cylinder 25 and between the top of the cylinder and the inner edge of the piston or follower 24. As will be apparent, this spring tends to force the piston 24 downwardly in the cylinder, and by so doing exerts a pressure tending to retain the table or bench to which the device may be attached in the elevated or inoperative position, and acts in effect as a counterweight for these parts.

When the table or bench is lowered, as illustrated in Figs. 10 and 11, the rod 21 is carried upwardly and with it the piston 24, the spring 31 being compressed. The upward movement of the piston results in a movement of the bell crank lever 27 in a counterclockwise direction, (see Figs. 8 to 11), with the result that the shoe 30 is moved downwardly against the frame piece 32, the short arm of the bell crank lever with the shoe 30 forming in effect a toggle which when the shoe 30 is forced down as described straightens out and tends to retain the parts in this position. As a result of the forcing down of the shoe 30 against the frame 32, a rigid support is provided for the doors to which the bell crank lever 27 is secured at 28, as previously described, this rigid support being entirely independent of the hinges and taking the weight of the table and benches from these parts. When the table and benches are elevated, the parts assume the normal position as shown in Figs. 8 and 9, in which they cannot interfere with the opening and closing of the doors.

While I have shown in the sectional view, Fig. 3, a bed structure, which is located in the cabinet, I lay no claim to the structure, as it is set forth in my pending application filed July 29th, 1927, Serial No. 209,260.

In the side cabinets may be located folding tables or other devices, but the constructions of these particular devices are not claimed in this application.

I claim:

1. The combination with a door adapted to swing on vertical hinges, of a structure secured to one face of the door on horizontal hinges and adapted to be swung either upwardly flush against the face of the door or into a horizontal position extending away from the door, means for supporting the outer end of said structure when in the horizontal position, a guide carried by the door, a member movable in said guide, a link connecting said member with the said structure whereby when the latter is moved into the alternative positions the member is made to travel along the guide, a spring engaging said member and opposing movement of the structure into the horizontal position, a second member pivotally secured to the door and operatively connected with the first member, and a shoe connected with the second member and adapted to be brought into contact with a relatively fixed surface by movement of the said structure into the horizontal position so that the springs are relieved by said shoe of a portion of the weight of the inner end of said structure.

2. The combination with a supporting structure, of a sub-structure hinged on horizontal hinges to the support and adapted to occupy a vertical position against the face of the supporting structure and in a substantially horizontal position projecting outwardly therefrom, a leg member adapted to support the outer end of said sub-structure when in the horizontal position, and a rod pivotally connected to the said leg member and to the supporting structure whereby the leg member is automatically moved from the dependent position which it occupies when the sub-structure is elevated to a substantially vertical position supporting the outer end of said sub-structure in the horizontal position and vice versa.

3. Means connecting the hinged edge of a sub-structure to a supporting structure including a member connected with the sub-structure and movable when the latter is moved, means engaging said member and opposing movement of the sub-structure, a bell crank lever secured to the supporting structure and connected with the movable member, and a shoe forming with one of the arms of the said bell crank lever a toggle whereby when the sub-structure is lowered the shoe is brought into engagement with the supporting structure and maintained in said engagement to support the sub-structure.

4. The combination with a supporting structure having a frame, of a sub-structure hinged to the support so as to occupy either a vertical or a horizontal position, a member connected to the sub-structure and movable when the latter is moved, means for opposing the movement of the sub-structure to a horizontal position, a bell crank lever secured to the supporting structure and connected with the movable member, and means connected to the bell crank and adapted to rest on the frame of the supporting structure when the sub-structure is lowered.

5. The combination with a supporting structure, of a sub-structure hinged to the support so as to occupy either a vertical or a horizontal position, a member connected with the sub-structure and movable when the latter is moved, a spring engaging the said member and opposing movement of the sub-structure to the horizontal position, a bell crank lever secured to the supporting structure and connected with the movable member, and a shoe forming with one of the arms of the said bell crank lever a toggle whereby when the sub-structure is lowered the shoe is brought into engagement with the supporting structure and maintained in said engagement to support the sub-structure.

FREDERICK B. KAUFMAN.